United States Patent [19]

Wenkman

[11] Patent Number: 5,760,369
[45] Date of Patent: Jun. 2, 1998

[54] METHOD OF LASER CUTTING PAPER CARDS FOR USE IN PAPER SCULPTURE

[75] Inventor: Gregory J. Wenkman, Middleton, Wis.

[73] Assignee: Uniek, Inc., Waunakee, Wis.

[21] Appl. No.: 717,091

[22] Filed: Sep. 20, 1996

[51] Int. Cl.$^6$ ................................................ B23K 26/00
[52] U.S. Cl. .................. 219/121.71; 219/121.69; 219/121.85
[58] Field of Search ............ 219/121.71, 121.72, 219/121.7, 121.6, 121.69, 121.85, 121.8; 40/124, 191

[56] References Cited

U.S. PATENT DOCUMENTS

| | | |
|---|---|---|
| 4,378,480 | 3/1983 | Langhans .................. 219/121.8 |
| 4,404,454 | 9/1983 | Taylor et al. ............... 219/121.7 |
| 5,183,598 | 2/1993 | Hellé et al. ................ 219/121.85 |
| 5,284,536 | 2/1994 | Gruber ...................... 219/121.6 |

*Primary Examiner*—Geoffrey S. Evans
*Attorney, Agent, or Firm*—Lathrop & Clark

[57] ABSTRACT

Paper cards for use in three-dimensional paper sculpture, wherein the cards have perforated images thereon produced by a laser beam directed by a computer-controlled movable mirror to the back surface of the cards in a predetermined pattern. Indicia for assembly of individual image elements are burned in the back of the cards during the cutting process.

10 Claims, 3 Drawing Sheets

METHOD OF LASER CUTTING PAPER CARDS FOR USE IN PAPER SCULPTURE

FIELD OF THE INVENTION

The present invention relates to three-dimensional paper sculpture, which is within the art of "decoupage." More particularly, the present invention relates to paper sculpture cards having perforated patterns therein, where the perforated patterns are produced by the use of a laser.

BACKGROUND OF THE INVENTION

The art of creating three-dimensional paper sculptures is practiced by many hobbyists throughout the world. Typically, the hobbyist purchases a paper sculpture "kit," which contains several sheets of paper, or "cards," having printed images on one surface. To produce a three-dimensional paper sculpture, the hobbyist starts with a background card, which has a picture, such as a reproduction of a painting, printed on one surface. The hobbyist then repeatedly stacks, using glue or pads having adhesive on both sides, the identical image from the other cards on top of each other, in the location where that image is found on the background card. This repeated stacking of the same image gives rise to a three-dimensional effect.

The creation of three-dimensional paper sculptures is very time consuming, because the hobbyist must cut each image from each card by hand, and in the exact outline of the image. In order to follow the outline exactly, it is necessary to cut the cards from the surface on which the image is printed. Unfortunately, by cutting the images in this manner, a visible edge that is the color of the paper sheet, usually white, can be seen along the outline of the image, which the hobbyist must then hand color to match the color of the image. Further, the fact that the images must be hand cut, typically using a craft knife with an extremely sharp blade, makes this art inaccessible to those, who for reasons of physical infirmity, such as arthritis, or for safety reasons, cannot accomplish the required cutting.

To make three-dimensional paper sculpture easier and safer, and hence more accessible to the average hobbyist, it would be desirable to mass produce paper sculpture cards having pre-cut images therein. Yet conventional methods of paper cutting, such as die-cutting the images from large sheets of paper comprising many cards, or by perforating the sheets along the outline of the images, using standard techniques, would be very costly. Furthermore, the intricate nature of many of the image outlines makes such techniques unfeasible on a large scale. Moreover, images cut by such techniques would have the undesirable visible white edges discussed above.

Thus, a need exists for a method of mass-producing paper cards from large paper sheets for use in the art of three-dimensional paper sculpture that have pre-cut or perforated images, where the color of the paper used to make the sheets cannot be easily seen at the edges of the images.

SUMMARY OF THE INVENTION

The method of the present invention involves pre-cutting or perforating images from paper sheets using at least one laser. The beam from the laser is directed by a computer-controlled, movable mirror onto a sheet of paper, and burns through the sheet from the surface opposite that where the picture is printed ("the back surface") to produce a series of perforations defining the outline of an image. The beam strikes the back surface of the sheet at an angle such that the perforations extend from the back surface to the front surface outwardly toward the edges of the paper sheet. This results in a perforated image in which little or none of the paper color is visible when viewed from the front surface of the sheet. The laser beam can be pulsed to create a series of perforations and land areas, and by shortening the contact time between the laser beam and the paper to a time less than that needed for the beam to pass from the back surface of the sheet through the front surface of the sheet, numbers or other identifiers can be provided on the back surface of each image to aid the hobbyist in assembly, without damaging the front surface of the image.

To produce various pre-cut images, the laser beam is directed by the movable mirror along a path that has been programmed into the computer that operates the mirror. This method allows for many different images to be cut from a sheet, thus allowing different cards to be produced from one sheet of paper. The cards are also cut by the laser beam.

The present invention also thus provides paper cards for use in three-dimensional paper sculpture, where the cards have perforated images therein that have been made by the above-described methods, and further provides a method for the efficient production of sets of cards.

It is a feature of the present invention to provide cards for three-dimensional sculpture art that have pre-cut or perforated images from a paper sheet, in which the color of the paper sheet is not easily visible from the front of the images.

It is another feature of the present invention to provide a method for mass production of pre-cut or perforated cards for three-dimensional paper sculpture.

It is an additional feature of the present invention to make the art of three-dimensional paper sculpture less difficult and time consuming to complete for the average hobbyist, thus making it accessible to more hobbyists.

Further objects, features and advantages of the invention will be apparent from the following detailed description when taken in conjunction with the accompanying drawings.

DESCRIPTION OF THE PREFERRED EMBODIMENT

Figure 8:
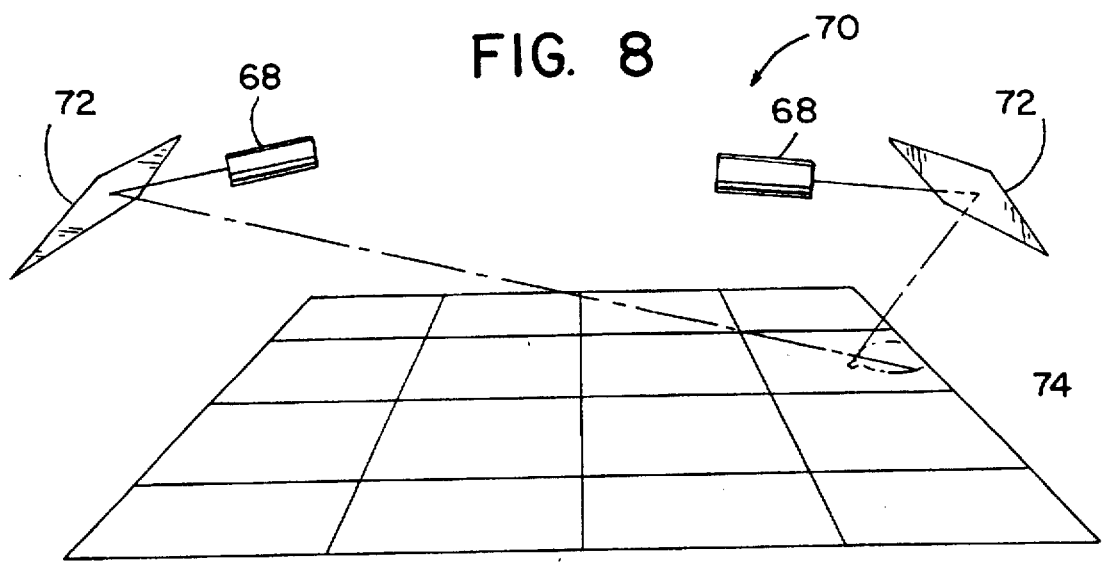
FIG. 8 is an isometric, somewhat schematic view of an alternative embodiment set-up for cutting a card using multiple lasers.
Figure 1:
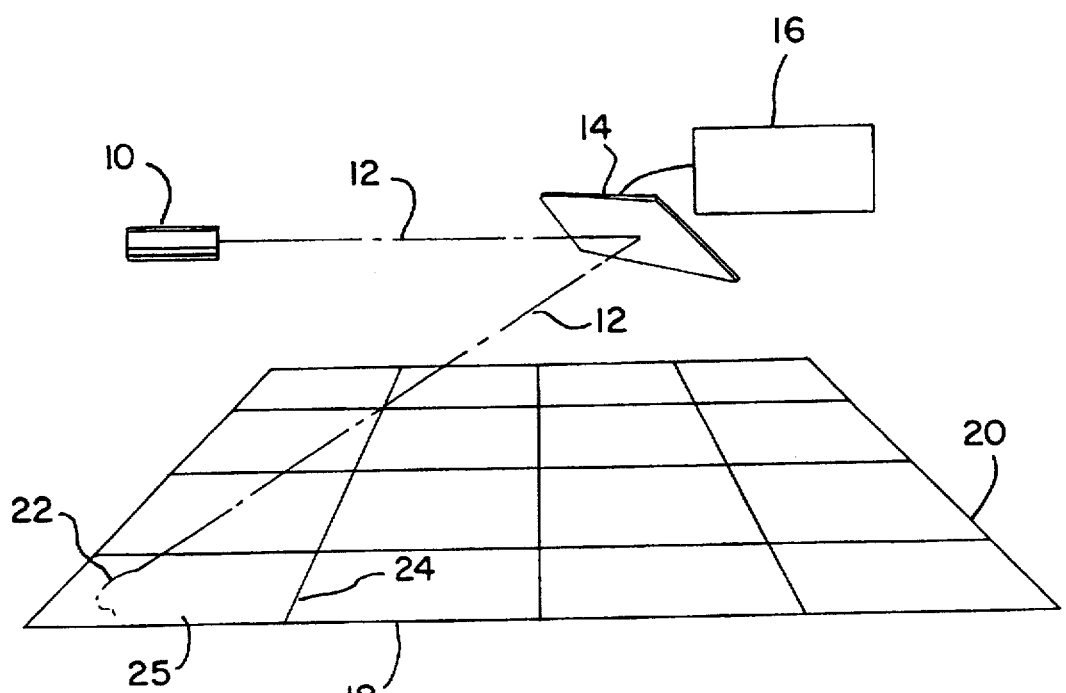
FIG. 1 is an isometric, somewhat schematic view of a printed paper sheet being cut by a laser cutting apparatus to form the cards of the kit of this invention.

Referring more particularly to FIGS. 1–8, wherein like numbers refer to similar parts, the method of the present invention is shown in FIG. 1. A stationary laser 10 directs a beam 12 towards a movable mirror 14. The position of the mirror 14 is determined by a computer controlled three-axis servo drive 16. The beam 12 is directed by the mirror 14 onto the back surface of a paper sheet 18 on a table 20, and passes through the paper at an angle. The mirror 14 directs the beam along the outline of images, such as image outline 22, that have been pre-programmed into the computer controlling the servo drive 16. As the beam 12 is directed along the image outline 22, it is pulsed or chopped, to form areas of "holes and tabs." This pulsing or chopping of the beam 12 is denoted by the beam 12 being a dotted line. A "hole," or perforation, is the area where the beam 12 cuts entirely through the sheet 18, while a "tab" is the area between the holes that is not struck by the beam, and therefore is not removed during the cutting operation. The rate of pulsing or chopping of the beam controls the ratio of perforations to tabs, and the length of the tabs between the perforations. Preferably, the rate of pulsing or chopping should be such that over 98 percent, and preferably about 99 percent of the outline of each image comprises perforations.

The beam 12 is also directed by the mirror 14 along a card outline 24, so that a plurality of cards 25 having perforated images is produced from the sheet 18. Typically, the paper sheet 18 has the dimensions 20 ½" by 29". The word "paper," as used herein, is meant to include any pulp or wood-fiber based product, including chipboard, cardboard, and other rigid or semi-rigid paper materials, such as that used to make greeting cards or trading cards. The number of cards that can be obtained from the paper sheet is dependent on the dimensions of the individual cards; for example a paper sheet having the above dimensions can yield sixteen 5" by 7" cards, eight 7" by 10" cards, or four 10" by 14" cards. Preferably, each of the cards cut from a single sheet 18 will have a different picture on its front surface and have different image outlines perforated therein. By varying the image outlines that are perforated from sheet to sheet, and then stacking the sheets on top of each other, many different kits of cards can be efficiently produced. Although for very large production runs, each of the cards cut from a single sheet can have the same picture on its front surface, and have the same image outlines perforated therein, for economy of production, it is preferred that each large sheet have a range of different images thereon for assembly into different kits. These card kits can then be easily collated and packaged, using conventional means, for sale to the hobbyist.

The cutting laser is controlled to cut out different portions of the images on subsequent large sheets presented to the laser cutter. A decoupage sculpture is assembled from multiple identical printed cards, with different regions representing different depths of the sculpture cut from each card. The computer controls the laser to cut out different portions of each image as the printed sheets are cut. Hence, by cutting the different layers of a sculpture kit sequentially from the identical large sheets, time consuming and costly collating is eliminated. This procedures results in substantial cost savings. In printing, large cards, for example a 20 ½ by 29 inch sheet, are printed with multiple different images of a small size. Since the cards are cut in sequence, with many designs per full sheet, the full volume of a full sheet can be significant, thus allowing greater production runs which greatly lowers the cost of each card and lowers film and printing plate charges and eliminates the need for manually collating. For example in a seven layer sculpture, the six upper layers will be cut on the laser cutter in order, and discharged onto a base sheet which has no perforations and which has been cut separately by mechanical means, for example a guillotine cutter. The cut cards are broken apart along the laser scribed perforations, instructions are added, and the individual stacks are shrink-wrapped into kit units.

Figure 2:
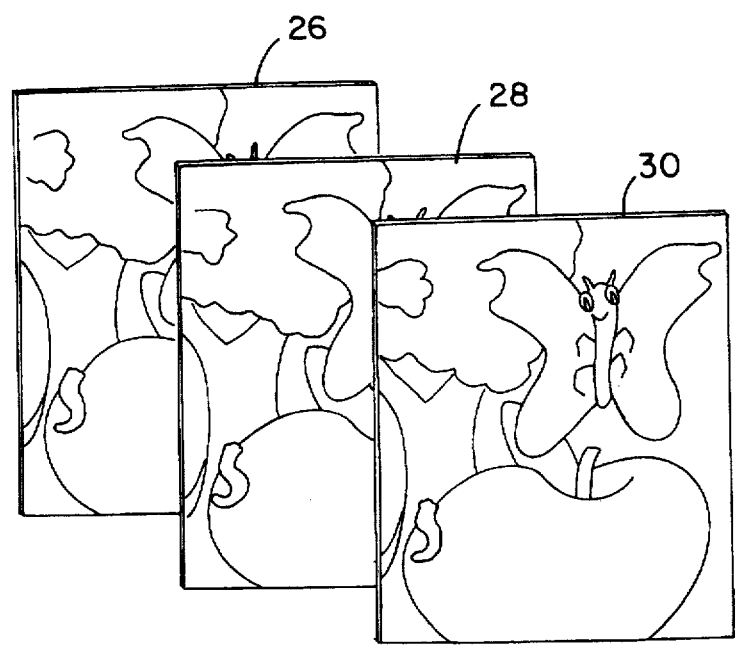
FIG. 2 is an exploded isometric front view of the individual cut cards of a three-dimensional paper sculpture kit of this invention.
Figures 3, 4, 5:
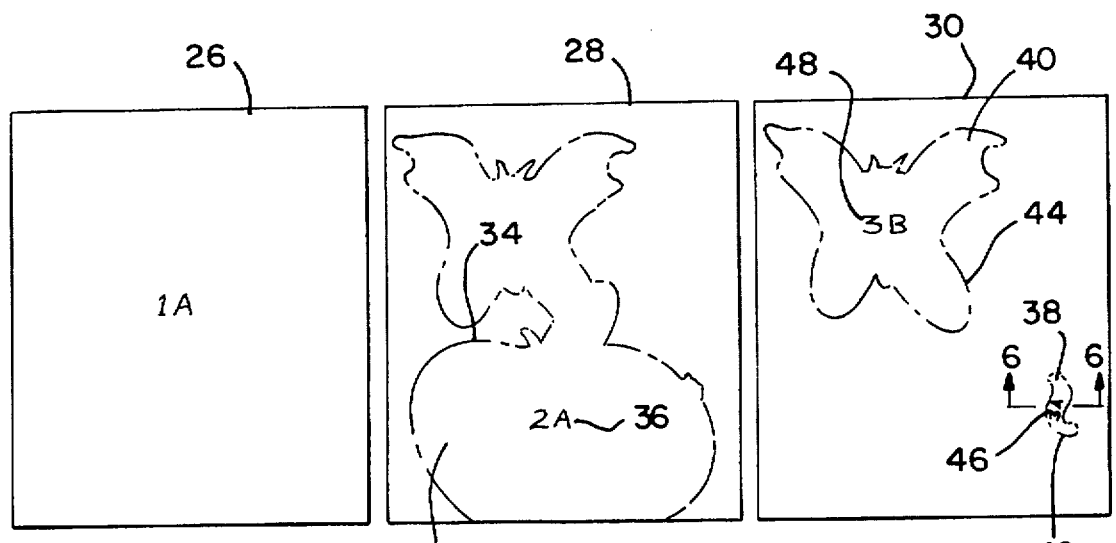
FIG. 3 is a rear elevational view of the base card of the kit of FIG. 2.
FIG. 4 is a rear elevational view of a laser cut intermediate card of the kit of FIG.2.
FIG. 5 is a rear elevational view of a laser cut top card of the kit of FIG. 2.

Suitable lasers for the present invention include $CO_2$ lasers with galvanometer scanners, such as those available from Laser Machining, Inc., of Somerset, Wis. The preferred laser for the present invention is a laser having a high beam quality and good pulse characteristics. Lasers in the 200–800 watt range often have these qualities and are well suited for use in the present invention. A 450 watt $CO_2$ laser is preferred. As stated above, the laser should have a galvanometer scanner. The galvanometer scanner should be able to focus the beam 12 sufficiently to allow for the paper sheet to be cleanly cut. Suitable galvanometer scanners have standard sizes ranging from 25 mm to 75 mm, and include 30 mm and 50 mm scanners, with a 50 mm scanner being preferred. The beam when it reaches the card surface is extremely narrow and cuts a very fine line. A series of cards 26, 28, and 30, forming all or part of a three-dimensional paper sculpture kit, is shown in FIG. 2. Each kit consists of a base card 26, from which no images have been perforated, and a plurality of cards 28 and 30, from which different images have been perforated, as shown in FIGS. 4 and 5. As shown in FIG. 2, each card has the same picture on its front surface, here a "nature" scene, including a butterfly, an apple and a worm. While it is preferred to provide a kit comprising cards having the same picture printed on the front surface of each card to allow the hobbyist to cut additional images from the cards other than those which have been perforated if he or she desires, the individual cards may also have only the specific perforated images on them. For example, card 28 could have only the image of the apple on it, while card 30 could have only the images of the butterfly and worm on it.

FIGS. 3–5 show the back surface of cards 26, 28, and 30 of FIG. 2. FIG. 3 shows the back surface of base card 26, from which no images have been perforated. FIG. 4 illustrates the back surface of the card 30, from which the image element 32 (here, the apple) has been perforated, as denoted by perforated line 34. An identifier 36, shown here as "2A," has been burned into the back surface of the card 30, by allowing the laser beam to strike the paper sheet for a time less than that needed to produce a hole in the paper sheet. The placement of identifiers on the back surface of the images aids the hobbyist during assembly, so that the images are stacked in the proper order. By burning the identifiers or indicia into the cards on the laser cutting machine, it is possible to eliminate the costly process of printing multiple different identifiers on the backs of the cards for different layers. There is hence no danger that an improper identifier will appear on a cut image element, as the identifiers and the cutting instructions for the image element are both formed by the same computer-controlled laser apparatus in the same process.

FIG. 5 shows the back surface of the card 28, from which parts bearing image elements 38 and 40 (the worm and butterfly, respectively) have been perforated, as denoted by perforation lines 42 and 44. As was shown in FIG. 4, identifiers 46 ("3A") and 48 ("3B") have been burned into the back surface of the image elements 38 and 40, respectively, in the same manner as described with respect to FIG. 4.

Figure 6:
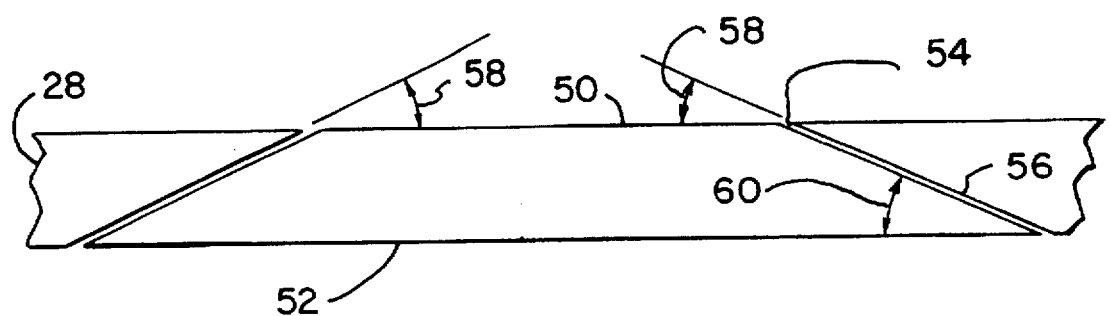
FIG. 6 is an enlarged cross-sectional view of the card of FIG. 5, taken along section line 6—6.

FIG. 6 illustrates the angled path taken by the beam 12 through a card 28 as it enters the back surface 50, and exits the front surface 52, thus producing a perforation 54 in the card 28, and forming an angled image edge 56. The beam 12 first strikes the back surface 50 at an angle 58, such that the image edge 56, and therefore perforation 54 angles outwardly in a direction from the back surface 50 to the front surface 52 towards the edges of the paper sheet. Thus, beam 12 strikes the back surface 50 in an orientation sufficient to create an acute angle 60, which is identical to angle 58, between the front surface 52 and the edge 56. In this way, when the image is removed from the card, the amount of edge 56 that is visible when the image is viewed from the front surface 52 is minimized. The amount of visible edge 56 will decrease as the angle 58 is made more acute; the angle can be adjusted as desired. The useful range of angles is preferably between 5 and 25 degrees, with 20 degrees being preferable.

To obtain the preferred angle path along the outline of each image, it is preferred that two lasers 68 be used in the practice of the present invention, as in the apparatus 70, shown in FIG. 2. The apparatus 70 has two mirrors 72 positioned on the opposite ends above a cutting table 74, so the beams can be deflected in such a manner as to provide for the preferred angled perforations along the entire outline of each image. This may also be accomplished by using a single laser, and moving the table. In addition, a single laser with multiple mirrors steered to direct the laser beam from opposite ends of the image may be employed. In the apparatus 70, the laser beam is directed to enter the back surface of the sheet and exit the front surface of the sheet to define an angled perforation cut which is at all locations inclined from the outer periphery of the image element to the inside rear surface of the image element, such that edge appearance of the sheet rearwardly of the printed image is minimized.

While it is preferred that the laser beam strike the back surface 50 in the manner described above, the beam 12 may strike the back surface from other angles, including those which result in the angle between the front surface 52 and edge 56 being 90° or greater. If all or part of the image is cut in this manner, when the image is viewed from the front surface, the edge may be visible to such an extent that the hobbyist may want to hand-color the edge in the color of the image in order to make the finished sculpture more aesthetically pleasing.

Figure 7:
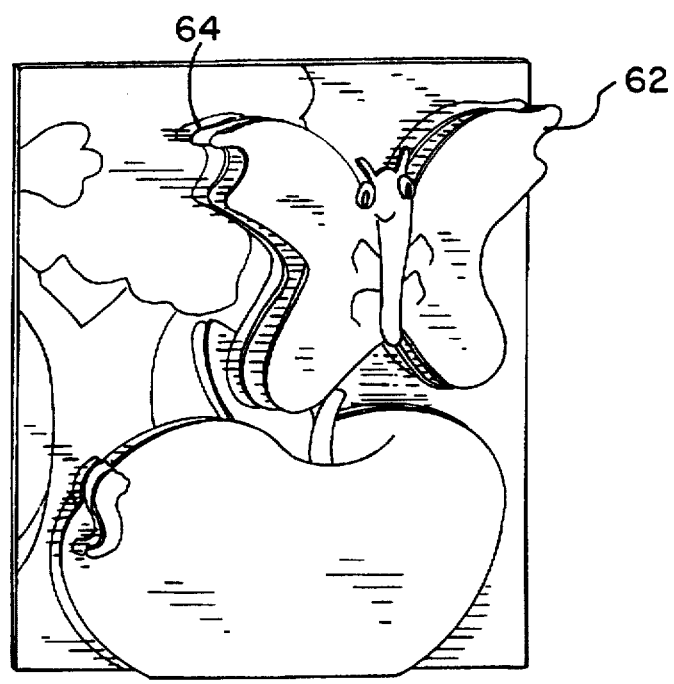
FIG. 7 is an isometric view of the assembled kit of FIG. 2.

FIG. 7 shows an assembled three-dimensional paper sculpture made using the sculpture cards of the present invention. As can be seen, the top card image 62 of the butterfly has been attached over the middle card butterfly image 64. Multiple images of the apple and worm have also been stacked in like manner, thus creating a three-dimensional effect for the viewer.

EXAMPLE

A white paper sheet having a thickness of 0.010" and a plurality of identical pictures on its front surface was placed with the front surface down on a laser cutting table. A beam from a 450 watt $CO_2$ laser with a 30 mm galvanometer was directed onto the back surface of the paper sheet by a mirror controlled by a three-axis servo controller into which specific images to be cut had been programmed. The beam struck the back surface of the paper sheet at an angle of approximately 25 degrees, creating individual cards having perforated images thereon. The perforated images were easily removed from the cards. No burning or other degradation of the front surface of the cards was produced.

It is understood that the invention is not limited to the particular construction and arrangement of parts herein illustrated and described, but embraces such modified forms thereof as come within the scope of the following claims.

I claim:

1. A method of producing paper cards for use in three-dimensional paper sculpture, comprising the steps of:

placing a first paper sheet comprising at least four cards having an image printed on their front surfaces on a cutting surface so that the back surface of the sheet will be exposed to a laser beam;

forming a plurality of perforations defining the outline of at least one image element in each card by deflecting a laser beam from at least one stationary laser with a computer controlled, movable mirror so that the beam passes from the back surface of the sheet through the front surface of the sheet in a predetermined pattern; and providing an identifier on the back surface of each image element by deflecting the laser beam from the stationary laser with a computer controlled, movable mirror, so that the beam strikes the back surface of each image in a predetermined pattern for an amount of time less than that needed for the beam to pass from the back surface through the front surface.

2. The method of claim 1, further comprising the step of separating the cards from each other.

3. The method of claim 1 further comprising the steps of:

removing the perforated first paper sheet from the cutting surface;

placing a second paper sheet on the cutting surface which is identical to the first paper sheet; and deflecting a laser beam to cut perforations in the second sheet to outline image elements which are different from the image elements outlined by perforations on the first paper sheet.

4. The method of claim 3 further comprising the steps of: assembling the perforated first paper sheet and the perforated second paper sheet with an unperforated base sheet having images printed thereon identical to that on the first paper sheet and the second paper sheet; and separating the assembled sheets into a plurality of kits of like images.

5. The method of claim 4 wherein each sheet has multiple different images printed thereon, such that a plurality of kits comprising different three-dimensional sculptural images are created.

6. A method of producing a plurality of paper card sets for use in three-dimensional paper sculpture, comprising:

subjecting at least three paper sheets to the method of claim 7, wherein each paper sheet comprises at least four cards having images on their front surfaces, and wherein each sheet comprises cards with images identical to the images on the cards on every other sheet, and wherein the image outlines perforated in the same card for each sheet differ;

placing the sheets on top of each other in a front surface to back surface relation to form a stack of sheets; and forming the stack of sheets into card sets corresponding to each card, by separating the cards on each sheet from one another.

7. A method for forming a precut card for assembly into a three-dimensional paper sculpture, comprising the steps of:

placing a paper sheet having a front surface with an image printed thereon face down on a cutting surface to expose the sheet back surface to a laser cutting beam; and directing a laser beam to cut a plurality of perforations encircling a discrete image element on the sheet, wherein the laser beam is directed to enter the back surface of the sheet and exit the front surface of the sheet to define an angled perforation cut which is at all locations inclined from the outer periphery of the image element to the inside rear surface of the image element, such that edge appearance of the sheet rearwardly of the printed image is minimized.

8. The method of claim 7 further comprising the the step of forming an an identifier on the back surface of each image element by deflecting the laser beam from the stationary laser with a computer controlled, movable mirror, so that the beam strikes the back surface of each image in a predetermined pattern for an amount of time less than that needed for the beam to pass from the back surface through the front surface.

9. The method of claim 7 further comprising the steps of cutting at least one additional sheet in a like manner, and packaging the multiple sheets together to form a kit for assembly into a three-dimensional paper sculpture.

10. A method of producing paper cards for use in three-dimensional paper sculpture, comprising the steps of:

placing a first paper sheet having at least one image printed on a front surface thereof on a cutting surface so that the back surface of the sheet will be exposed to a laser beam;

forming a plurality of perforations defining the outline of at least one image element in the first paper sheet by directing a laser to cut through the back surface of the first sheet at an angle other than perpendicular to the first sheet;

removing the first perforated paper sheet from the cutting surface;

placing a second paper sheet having a front surface with a printed image identical to that of the first paper sheet on the cutting surface so that the back surface of the sheet will be exposed to a laser beam; and forming a plurality of perforations defining the outline of at least one image element in the second paper sheet by directing a laser to cut through the back surface of the second sheet at an angle other than perpendicular to the second sheet, wherein the image element outlined by perforations in the second sheet is different than the image element outlined by perforations in the first paper sheet, such that the image elements of the first and second sheet may later be separated from the sheets and assembled into a three dimensional paper sculpture.

* * * * *